US008074265B2

(12) United States Patent
Relyea

(10) Patent No.: US 8,074,265 B2
(45) Date of Patent: Dec. 6, 2011

(54) METHODS AND SYSTEMS FOR VERIFYING A LOCATION FACTOR ASSOCIATED WITH A TOKEN

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 826 days.

(21) Appl. No.: 11/469,441

(22) Filed: Aug. 31, 2006

(65) Prior Publication Data

US 2008/0069338 A1    Mar. 20, 2008

(51) Int. Cl.
G06F 7/04 (2006.01)
G06F 15/16 (2006.01)
H04L 29/06 (2006.01)
H04L 9/30 (2006.01)

(52) U.S. Cl. .......................................................... 726/9

(58) Field of Classification Search .................. 713/172; 726/9; 380/30
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A * | 4/1998 | Abraham et al. ............... 705/73 |
| 5,745,678 A | 4/1998 | Herzberg et al. |
| 5,768,373 A | 6/1998 | Lohstroh et al. |
| 5,862,310 A | 1/1999 | Crawford et al. |
| 5,923,884 A | 7/1999 | Peyret et al. |
| 5,937,066 A | 8/1999 | Gennaro et al. |
| 5,943,423 A | 8/1999 | Muftic |
| 5,991,411 A * | 11/1999 | Kaufman et al. ............... 705/67 |
| 5,991,882 A | 11/1999 | O'Connell |
| 6,005,942 A | 12/1999 | Chan et al. |
| 6,005,945 A | 12/1999 | Whitehouse |
| 6,011,847 A | 1/2000 | Follendore, III |

(Continued)

FOREIGN PATENT DOCUMENTS

WO          9724831          7/1997

(Continued)

OTHER PUBLICATIONS

Schneier, "Applied Cryptography: Protocols, Algorithms, and Source Code in C", 1996, John Wiley & Sons, Inc., Second Edition, pp455-456.*

(Continued)

*Primary Examiner* — Michael Simitoski
(74) *Attorney, Agent, or Firm* — Lowenstein Sandler PC

(57) ABSTRACT

A server, method and/or computer-readable medium verifies a location factor associated with a token. The server generates a challenge and encrypts the challenge by a key commonly shared by the server and the token, and transmits the encrypted challenge to the token. The token decrypts the encrypted challenge by the commonly shared key and manipulates the challenge by an elliptic curve cryptography (ECC) procedure so that the server can verify that the signed manipulated challenge was generated at the token based upon the ECC public key.

18 Claims, 5 Drawing Sheets

U.S. PATENT DOCUMENTS

| | | | |
|---|---|---|---|
| 6,016,476 | A | 1/2000 | Maes et al. |
| 6,044,155 | A | 3/2000 | Thomlinson et al. |
| 6,072,876 | A | 6/2000 | Obata et al. |
| 6,141,420 | A | 10/2000 | Vanstone et al. |
| 6,178,507 | B1 * | 1/2001 | Vanstone ............... 713/169 |
| 6,179,205 | B1 | 1/2001 | Sloan |
| 6,226,744 | B1 | 5/2001 | Murphy et al. |
| 6,377,825 | B1 | 4/2002 | Kennedy et al. |
| 6,490,680 | B1 | 12/2002 | Scheidt et al. |
| 6,502,108 | B1 | 12/2002 | Day et al. |
| 6,539,093 | B1 | 3/2003 | Asad et al. |
| 6,636,975 | B1 | 10/2003 | Khidekel et al. |
| 6,643,701 | B1 | 11/2003 | Aziz et al. |
| 6,687,190 | B2 | 2/2004 | Momich et al. |
| 6,691,137 | B1 | 2/2004 | Kishi |
| 6,698,654 | B1 | 3/2004 | Zuppicich |
| 6,734,886 | B1 | 5/2004 | Hagan et al. |
| 6,760,752 | B1 | 7/2004 | Liu et al. |
| 6,804,687 | B2 | 10/2004 | Sampson |
| 6,819,766 | B1 | 11/2004 | Weidong |
| 6,826,686 | B1 | 11/2004 | Peyravian |
| 6,829,712 | B1 | 12/2004 | Madoukh |
| 6,880,037 | B2 | 4/2005 | Boyer |
| 6,880,084 | B1 | 4/2005 | Brittenham et al. |
| 6,898,605 | B2 | 5/2005 | Constantino |
| 6,898,714 | B1 | 5/2005 | Nadalin et al. |
| 6,931,133 | B2 | 8/2005 | Andrews et al. |
| 6,941,326 | B2 | 9/2005 | Kadyk et al. |
| 6,970,970 | B2 | 11/2005 | Jung et al. |
| 6,978,933 | B2 | 12/2005 | Yap et al. |
| 6,986,040 | B1 | 1/2006 | Kramer et al. |
| 7,007,105 | B1 | 2/2006 | Sullivan et al. |
| 7,010,600 | B1 | 3/2006 | Prasad et al. |
| 7,050,589 | B2 | 5/2006 | Kwan |
| 7,051,213 | B1 | 5/2006 | Kobayashi et al. |
| 7,085,386 | B2 | 8/2006 | Audebert et al. |
| 7,114,028 | B1 | 9/2006 | Green et al. |
| 7,156,302 | B2 | 1/2007 | Yap et al. |
| 7,159,763 | B2 | 1/2007 | Yap et al. |
| 7,185,018 | B2 | 2/2007 | Archbold et al. |
| 7,251,728 | B2 | 7/2007 | Toh et al. |
| 7,278,581 | B2 | 10/2007 | Ong |
| 7,299,364 | B2 | 11/2007 | Noble et al. |
| 7,302,585 | B1 | 11/2007 | Proudler et al. |
| 7,356,688 | B1 | 4/2008 | Wang |
| 7,374,099 | B2 | 5/2008 | de Jong |
| 7,386,705 | B2 | 6/2008 | Low et al. |
| 7,437,757 | B2 | 10/2008 | Holdsworth |
| 7,451,921 | B2 | 11/2008 | Dowling et al. |
| 7,475,250 | B2 | 1/2009 | Aull et al. |
| 7,475,256 | B2 | 1/2009 | Cook |
| 7,480,384 | B2 | 1/2009 | Peyravian et al. |
| 7,502,793 | B2 | 3/2009 | Snible et al. |
| 7,571,321 | B2 | 8/2009 | Appenzeller et al. |
| 7,602,910 | B2 | 10/2009 | Johansson et al. |
| 7,702,917 | B2 | 4/2010 | Tevosyan et al. |
| 7,769,996 | B2 | 8/2010 | Randle et al. |
| 7,822,209 | B2 | 10/2010 | Fu et al. |
| 7,860,243 | B2 | 12/2010 | Zheng et al. |
| 2001/0008012 | A1 | 7/2001 | Kausik |
| 2001/0036276 | A1 | 11/2001 | Ober et al. |
| 2001/0054148 | A1 | 12/2001 | Hoornaert et al. |
| 2002/0004816 | A1 | 1/2002 | Vange et al. |
| 2002/0007351 | A1 | 1/2002 | Hillegass et al. |
| 2002/0007359 | A1 | 1/2002 | Nguyen |
| 2002/0010679 | A1 | 1/2002 | Felsher |
| 2002/0029343 | A1 | 3/2002 | Kurita |
| 2002/0056044 | A1 | 5/2002 | Andersson |
| 2002/0059144 | A1 | 5/2002 | Meffert et al. |
| 2002/0064095 | A1 | 5/2002 | Momich et al. |
| 2002/0080958 | A1 | 6/2002 | Ober et al. |
| 2002/0099727 | A1 | 7/2002 | Kadyk et al. |
| 2002/0112156 | A1 | 8/2002 | Gien et al. |
| 2002/0120842 | A1 | 8/2002 | Bragstad et al. |
| 2002/0133707 | A1 | 9/2002 | Newcombe |
| 2002/0171546 | A1 | 11/2002 | Evans et al. |
| 2002/0184149 | A1 | 12/2002 | Jones |
| 2002/0188848 | A1 | 12/2002 | Buttiker |
| 2003/0005291 | A1 | 1/2003 | Burn |
| 2003/0012386 | A1 | 1/2003 | Kim et al. |
| 2003/0028664 | A1 | 2/2003 | Tan et al. |
| 2003/0035548 | A1 | 2/2003 | Kwan |
| 2003/0056099 | A1 | 3/2003 | Asanoma et al. |
| 2003/0075610 | A1 | 4/2003 | Ong |
| 2003/0093695 | A1 | 5/2003 | Dutta |
| 2003/0115455 | A1 | 6/2003 | Aull et al. |
| 2003/0115466 | A1 | 6/2003 | Aull et al. |
| 2003/0115467 | A1 | 6/2003 | Aull et al. |
| 2003/0115468 | A1 | 6/2003 | Aull et al. |
| 2003/0167399 | A1 | 9/2003 | Audebert et al. |
| 2003/0172034 | A1 | 9/2003 | Schneck et al. |
| 2004/0042620 | A1 | 3/2004 | Andrews et al. |
| 2004/0053642 | A1 | 3/2004 | Sandberg et al. |
| 2004/0066274 | A1 | 4/2004 | Bailey |
| 2004/0088562 | A1 | 5/2004 | Vassilev et al. |
| 2004/0096055 | A1 | 5/2004 | Williams et al. |
| 2004/0103324 | A1 | 5/2004 | Band |
| 2004/0103325 | A1 | 5/2004 | Priebatsch |
| 2004/0120525 | A1 | 6/2004 | Miskimmin et al. |
| 2004/0144840 | A1 | 7/2004 | Lee et al. |
| 2004/0146163 | A1 | 7/2004 | Asokan et al. |
| 2004/0153451 | A1 | 8/2004 | Phillips et al. |
| 2004/0162786 | A1 | 8/2004 | Cross et al. |
| 2004/0230831 | A1 | 11/2004 | Spelman et al. |
| 2005/0022123 | A1 | 1/2005 | Costantino |
| 2005/0033703 | A1 | 2/2005 | Holdsworth |
| 2005/0109841 | A1 | 5/2005 | Ryan et al. |
| 2005/0114673 | A1 | 5/2005 | Raikar et al. |
| 2005/0119978 | A1 | 6/2005 | Ates |
| 2005/0123142 | A1 | 6/2005 | Freeman et al. |
| 2005/0138386 | A1 * | 6/2005 | Le Saint ............... 713/185 |
| 2005/0138390 | A1 | 6/2005 | Adams et al. |
| 2005/0144312 | A1 | 6/2005 | Kadyk et al. |
| 2005/0184163 | A1 | 8/2005 | de Jong |
| 2005/0184164 | A1 | 8/2005 | de Jong |
| 2005/0184165 | A1 | 8/2005 | de Jong |
| 2005/0188360 | A1 | 8/2005 | de Jong |
| 2005/0216732 | A1 | 9/2005 | Kipnis et al. |
| 2005/0262361 | A1 | 11/2005 | Thibadeau |
| 2005/0279827 | A1 | 12/2005 | Mascavage et al. |
| 2005/0289652 | A1 | 12/2005 | Sharma et al. |
| 2006/0005028 | A1 | 1/2006 | Labaton |
| 2006/0010325 | A1 | 1/2006 | Liu et al. |
| 2006/0015933 | A1 | 1/2006 | Ballinger et al. |
| 2006/0036868 | A1 | 2/2006 | Cicchitto |
| 2006/0043164 | A1 | 3/2006 | Dowling et al. |
| 2006/0072747 | A1 | 4/2006 | Wood et al. |
| 2006/0073812 | A1 | 4/2006 | Punaganti Venkata et al. |
| 2006/0075133 | A1 | 4/2006 | Kakivaya et al. |
| 2006/0075486 | A1 | 4/2006 | Lin et al. |
| 2006/0101111 | A1 | 5/2006 | Bouse et al. |
| 2006/0101506 | A1 | 5/2006 | Gallo et al. |
| 2006/0173848 | A1 | 8/2006 | Peterson et al. |
| 2006/0174104 | A1 | 8/2006 | Crichton et al. |
| 2006/0206932 | A1 | 9/2006 | Chong |
| 2006/0208066 | A1 | 9/2006 | Finn et al. |
| 2006/0226243 | A1 | 10/2006 | Dariel |
| 2006/0291664 | A1 | 12/2006 | Suarez et al. |
| 2006/0294583 | A1 | 12/2006 | Cowburn et al. |
| 2007/0014416 | A1 | 1/2007 | Rivera et al. |
| 2007/0074034 | A1 | 3/2007 | Adams et al. |
| 2007/0112721 | A1 | 5/2007 | Archbold et al. |
| 2007/0113267 | A1 | 5/2007 | Iwanski et al. |
| 2007/0113271 | A1 | 5/2007 | Pleunis |
| 2007/0118891 | A1 | 5/2007 | Buer |
| 2007/0162967 | A1 | 7/2007 | de Jong et al. |
| 2007/0169084 | A1 | 7/2007 | Frank et al. |
| 2007/0189534 | A1 | 8/2007 | Wood et al. |
| 2007/0204333 | A1 | 8/2007 | Lear et al. |
| 2007/0230706 | A1 | 10/2007 | Youn |
| 2007/0271601 | A1 | 11/2007 | Pomerantz |
| 2007/0277032 | A1 | 11/2007 | Relyea |
| 2007/0280483 | A1 | 12/2007 | Fu |
| 2007/0282881 | A1 | 12/2007 | Relyea |
| 2007/0283163 | A1 | 12/2007 | Relyea |
| 2007/0283427 | A1 | 12/2007 | Gupta et al. |
| 2007/0288745 | A1 | 12/2007 | Kwan |

| | | |
|---|---|---|
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1* | 2/2008 | Law .............................. 713/183 |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0373027 | 12/2010 | Taylor |

FOREIGN PATENT DOCUMENTS

| | | |
|---|---|---|
| WO | 0048064 A1 | 8/2000 |
| WO | 2007096590 A1 | 8/2007 |

OTHER PUBLICATIONS

Schneier, Bruce. Applied Cryptography, Second Edition. 1996 John Wiley and Sons, pp. 480-481.*

"ATM and Credit Card Notification", Feb 2005 (internet archive) pp. 1-2, www.thereareplaces.com/infgdes/money.atmnotif.htm.

"AMD Announces Specification for Open Platform Management Architecture", Feb. 28, 2005, pp. 1-2, http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Cryptographic Message Syntax, R. Housley, Request for Comments (RFC) 2630, Network Working Group, The Internet Society, Jun. 1999.

Zuccherato, Robert, "Elliptic Curve Cryptography Support Entrust", May 9, 2000.

Red Hat Certificate System, http://www.redhat.com/f/pdf/rhas/DirSecProductSheetCertificateSystem.pdf, Jun. 2005.

PKCS#11 v.2.20: Cryptographic Token Interface Standard, RSA Laboratories, Jun. 28, 2004, (see, e.g, Chapter 10, Objects) (see www.rsasecurity.com, 407 pgs).

Balfanz (Dirk ABalfanz, "Access Control for Ad-Hoc Collaboration", Princeton University Jan. 2001).

* cited by examiner

US 8,074,265 B2

METHODS AND SYSTEMS FOR VERIFYING A LOCATION FACTOR ASSOCIATED WITH A TOKEN

FIELD OF THE INVENTION

The present invention relates generally to security in connection with token based access to a multi-user processing environment defined by a server and, more particularly, to a method and system for providing verification of a location factor associated with the token by the server.

BACKGROUND OF THE INVENTION

As computer systems and associated networks become more ubiquitous and complex, as the sensitivity of the content of the systems and network increases, and as the conventional user access paradigms changes for organizations of all types and sizes, from main offices or workplaces having dedicated IT systems to decentralized networks of IT servers and the like, system security rapidly becomes a major concern. Where secure access is required for individuals in a multi-user environment, security and identity verification and management become more important in maintaining system and network security and data integrity.

In view of these concerns, conventional computer systems and associated networks include a server that acts as a certificate authority for authenticating users. Particularly, the server issues certificates to the users after successful performance of an authentication process, which involves the user presenting a token, such as universal serial bus (USB) tokens, smartcards or the like, to the server via a client device such as a host computer. The token is generally accepted as an integral part of a two-factor security paradigm in which possession of the token is the first factor and authentication of the holder of the token is the second factor. The token includes a key that is used by the token to generate a digital signature, which is presented to the server. The server acting as the certificate authority issues a certificate to the token if the digital signature is valid.

Problems can arise when, for example, a user of a token inadvertently or even intentionally reveals the token's key to a third party such as a process running in the multi-user processing environment including unauthorized or malicious processes. These processes can than generate a digital signature based upon the key obtained from the token, thereby deceiving the server acting as the certificate authority into improperly issuing a certificate. Accordingly, the certificate authority may not be able to obtain a level of trust needed to issue higher levels of privileges to a particular token because the certificate authority is unable to verify that the digital signature was generated by the token rather than by an unauthorized or malicious process that has gained access to the key.

Therefore it would be desirable for a solution to facilitate a server to verify that a digital signature was actually generated at a specific token rather than by an unauthorized or malicious process in order to give higher levels of privileges to the specific token. In addition, factors such as scalability, standards compliance, regulatory compliance, security administration and the like must also be taken into consideration.

While a general background including problems in the art are described hereinabove, with occasional reference to related art or general concepts associated with the present invention, the above description is not intended to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate various exemplary embodiments of the invention and together with the description, serve to explain the principles of the invention. In the figures.

DETAILED DESCRIPTION

Figure 1:
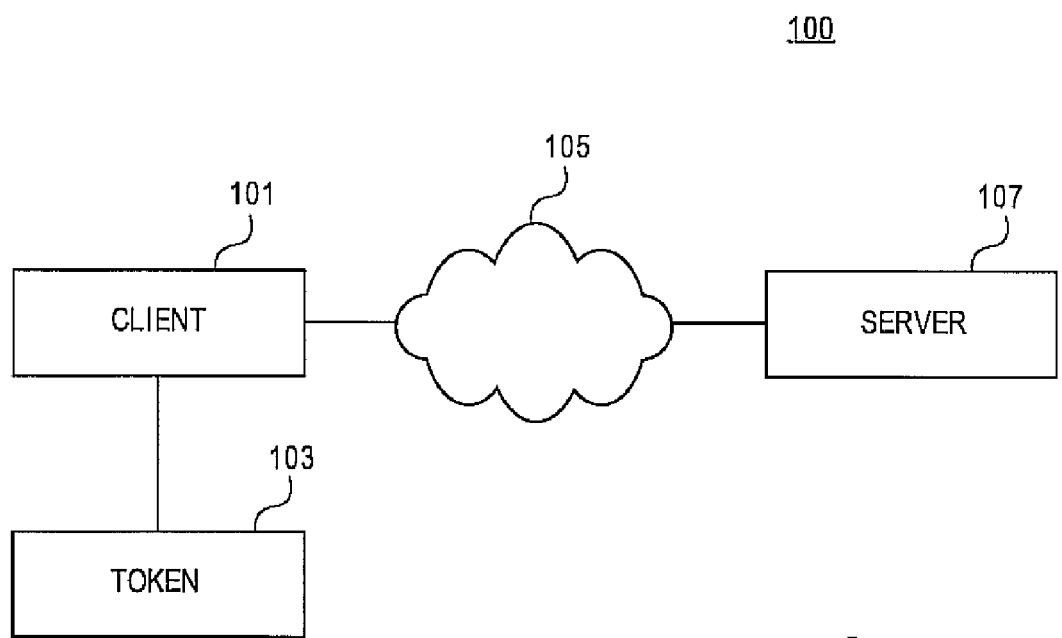
FIG. 1 illustrates a simplified and representative computer system.

Accordingly, one or more embodiments relate generally to a computer system, server, token, method and/or computer-readable medium for verifying a location factor associated with the token. The token receives an encrypted challenge from a server. The encrypted challenge is encrypted by a key commonly shared by the server and the token. The token then decrypts the encrypted challenge by the commonly shared key and manipulates the challenge by a predetermined elliptic curve cryptography (ECC) procedure to obtain a manipulated challenge. The token returns a signed manipulated challenge and an ECC public key to the server as a reply to the challenge. The server receives the signed manipulated challenge and verifies that the signed manipulated challenge was actually generated at the token based upon the ECC public key.

Other embodiments also provide a server that includes a processor configured to receive the signed manipulated challenge and ECC public key from the token. The processor verifies that the signed manipulated challenge was generated at the token based upon the ECC public key.

Other embodiments also provide a token, and/or computer-readable medium for facilitating verification of a location factor associated with the token by the server. The token includes a processor configured to manipulate the challenge by the predetermined ECC procedure to obtain a manipulated challenge and returns the manipulated challenge to the server as a reply to the challenge for verification at the server.

In overview, the present disclosure concerns secure computer systems such as may be operated in connection with certifying and/or authenticating identifiers associated with users and/or computers and/or tokens. Such secure systems may be utilized in connection with other services such as communications, secured access, and/or telecommunications. Such secure systems can include computer systems which support the use of tokens to access independent data objects representing certificates, keys, identifiers, and related data, for example by providing end-user interfaces, managing keys, and providing authentication. More particularly, various inventive concepts and principles are embodied in systems, devices, and methods therein for verifying a location factor of a token.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to verify a location factor of a token.

Further in accordance with exemplary embodiments, a server acting as a certificate authority, can verify that a digital signature was actually generated at a token before issuing a certificate for the token.

The phrase "data objects" as used herein refers to information representing certificates, private and public keys, and related data. This information is conventionally stored somewhere on the token and the server.

Reference will now be made in detail to the accompanying drawings. Wherever possible, the same reference numbers will be used throughout the drawings to refer to the same or like parts.

Referring now to FIG. 1, a simplified and representative computer system will be discussed and described. The computer system 100 includes a client 101, a token 103, and a server 107. The server 107 and client 101 are connected via a connection 105 which can be a direct connection such as a wired or wireless connection or can be an indirect connection such as a connection through the Internet, local area network, wide area network, communication network, etc. Generally, the connection 105 provides a communication channel for the server 107 and the token 103 to exchange data via the client 101 as an interface.

It will also be appreciated that in some instances, the server 107 and client 101 can exist within the same computer and therefore can be connected with a data bus or high speed serial connection or the like. The server 107 has access to information stored locally, and also can access information stored remotely in various external data systems (not shown) provided a proper interface exists to the external data systems. It will be appreciated that the server 107 may be a general purpose computer or dedicated computing platform configured to execute secure and/or unsecure (or open) applications through a multiple user operating system (not shown). While many operations are performed in connection with the client 101, the server 107 can operate independently for certain procedures. The server 107 may be implemented with general purpose server platforms as known to those skilled in the art from Intel, Advanced Micro Devices, Hewlett-Packard, and/or others or can be implemented with other custom configured server architectures.

The client 101 can include a general purpose computer or dedicated computing platform configured to execute secure and/or open applications through the multi-user operating system of the server 107 or can operate through an independent operating system or independent version of the operating system of server 107. The client 101 can include a personal computer, a workstation, a thin client, a thick client, or other similar computing platform. It will be appreciated that thin client means a computer or client in a client-server architecture having little or no application logic and therefore having a small boot image. A thin client depends primarily on the central server, such as server 107, for processing activities. Therefore client 101, when operating as a thin client has no more software than is required to connect to server 107, and generally facilitate interaction between the token 103 and the server 107.

Figure 2:
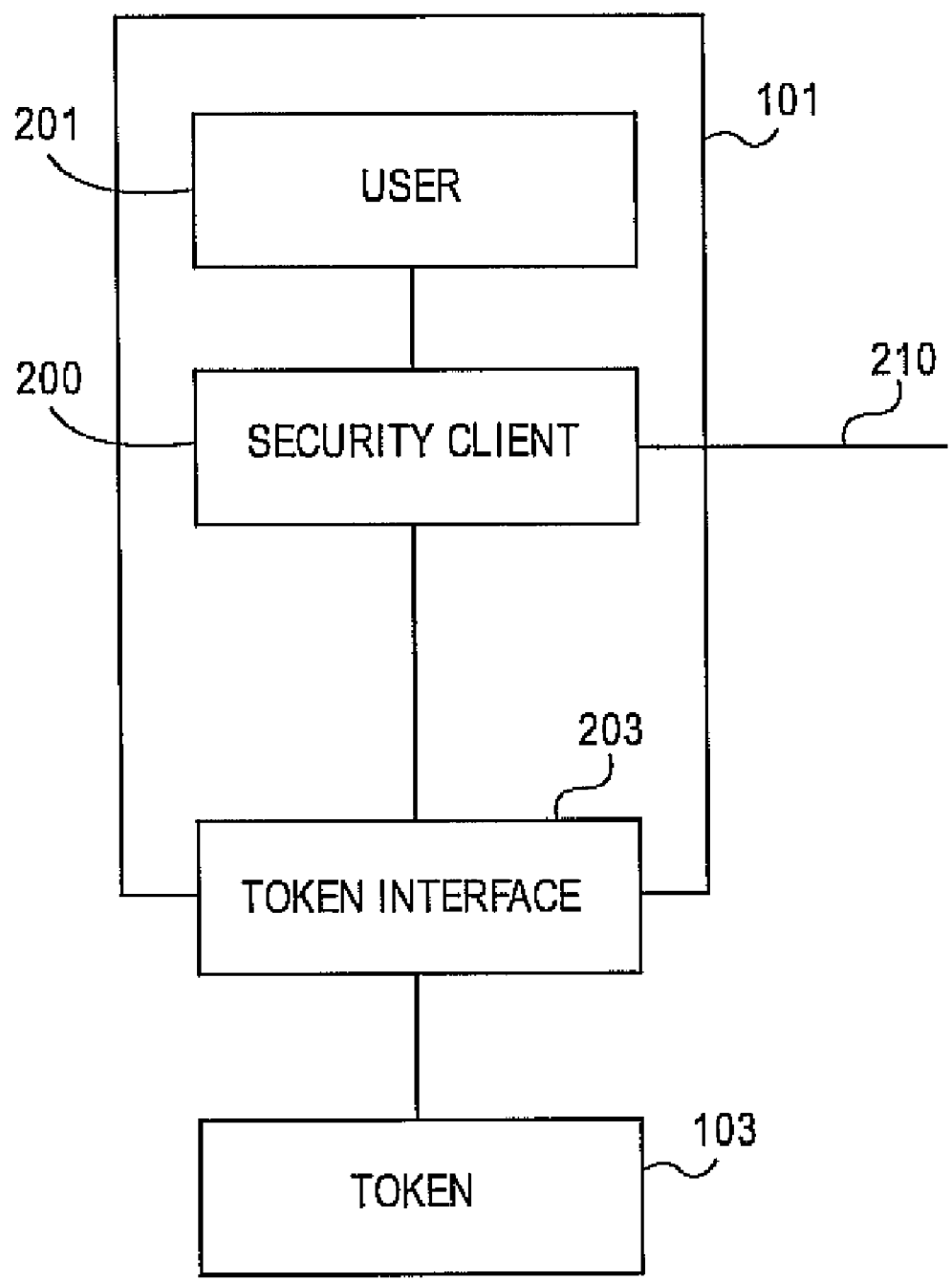
FIG. 2 is a block diagram illustrating portions of an exemplary client.

Referring to FIG. 2, an exemplary client 101 will be discussed. The client 101 may be configured in accordance with known techniques so that the server 107 can connect to the token 103 transparently through the client 101. Client 101 can include a security client 200, which can be a software program or process executing on the client 101. The client 101 can also include a token interface 203, which can include all or portion of an independent token interface, and/or an interface integral to the token. The client 101 can also include a hardware interface, a software interface or a combination thereof, such as a universal serial bus (USB) connector circuit and USB software driver. The client 101 can further include a user 201, which can be a user process or user agent such as an application program possibly including an application program interface (API), the application process for providing a dialog to a requester for inputting information into the client 101 such as a password or the like. In addition to a password, the client 101, and specifically the application process can receive data objects such as encrypted challenges, key generation requests, etc. from the server 107, digital signatures, keys, etc. from the token 103, and other data objects associated with the authentication process that is discussed below.

The client 101 can also include a connection 210 for connecting to a server such as server 107 described in FIG. 1. The connection 210 can be used by the client 101 to connect with the server 107 for card management purposes and the like.

Figure 3:
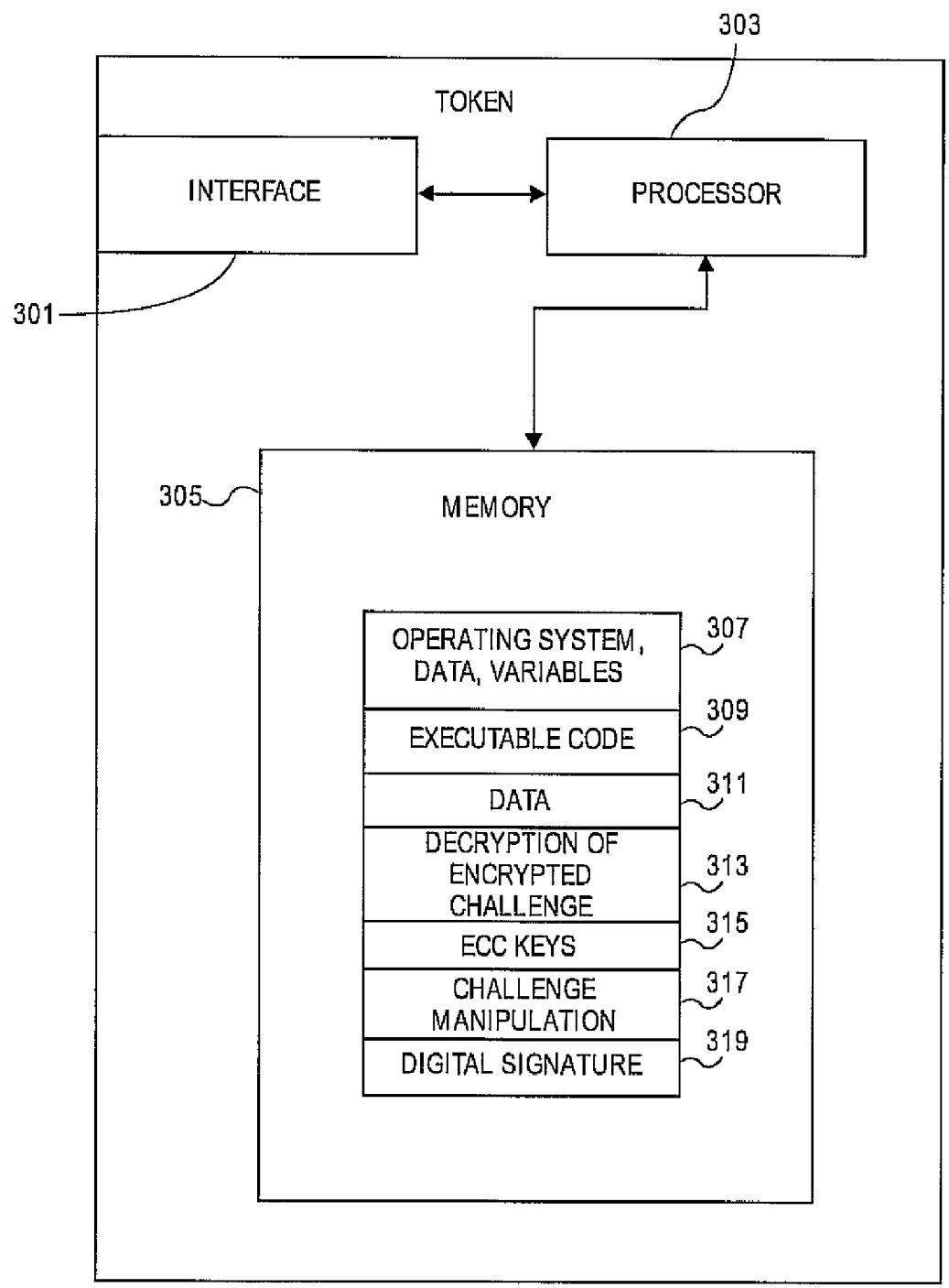
FIG. 3 is a block diagram illustrating portions of an exemplary token.

Referring to FIG. 3, an exemplary token 103 will be discussed. The token 103 includes an interface 301, a processor 303 and a memory 305. The interface 301 may be a universal serial bus (USB) connector circuit and USB software driver. The interface 301 is generally for providing hardware as well as software connection with the client 101. Further, the interface 301 can provide power as part of an interface standard to the token 103 from the client 101. For example, the USB standard calls for pins 1 and 4 to provide Vcc and GND, with Vcc being around 5 volts DC. The processor 303 can be one of a variety of different processors including general purpose processors, custom processors, controllers, compact eight-bit processors or the like. The memory 305 can be one or a combination of a variety of types of memory such as random access memory (RAM), read only memory (ROM), flash memory, dynamic RAM (DRAM) or the like. The memory 305 can include a basic operating system, data, and variables 307, executable code 309, and other data 311. Further, the memory 305 can include computer programs (or instructions) associated with an authentication process such as those discussed below which can direct the processor 303 in controlling the operation of the token 103. The computer programs can include, for example, decryption of encrypted challenge 313, elliptic curve cryptography (ECC) key generation or retrieval 315, challenge manipulation 317, and digital signature generation 319. These are described in more detail below.

Generally, the processor 303 will execute instructions defined by processes stored in, for example, the memory 305, such as the authentication process discussed later. Particularly, the processor 303 is configured to decrypt an encrypted challenge received from the server 107 that was encrypted by a key commonly shared by the server 107 and the token 103. Accordingly, the token 103 includes one or more commonly shared keys in the memory 205. The token 103 uses the one or more commonly shared keys to decrypt the encrypted challenge received from the server 107. The processor 303 is further configured to manipulate a decrypted challenge by a predetermined ECC procedure to obtain a manipulated challenge, and to return the manipulated challenge to the server 107 as a reply to the challenge for verification at the server 107.

The predetermined ECC procedure can include manipulating a challenge with an ECC public key to obtain a manipulated challenge and signing the manipulated challenge with an ECC private key. The ECC public and private key can be obtained generally at ECC key generation or retrieval 315 by, for example, first selecting an elliptic curve defined by an equation of the form $y^2=x^3+ax+b$ and a point $P=(x,y)$ referred to as a generating point. A random integer d on the elliptic curve will be selected as a private ECC key. A value dP, which is another point on the elliptic curve, will be computed. The value dP can become the ECC public key, which will be communicated to the server 107. If an unintended party obtains the ECC public key, which is the value dP, due to the characteristic of elliptic curves, the party will still have great difficulty determining the private ECC key d. The ECC public and private keys are generally stored at the token 103 in the memory 305. The ECC public and private keys may be determined and stored in the memory 305 at time of manufacture. Alternatively, they may be generated by the processor 303 upon initial operation of the token 103 by performing an initialization process. Further, they processor 303 may dynamically generated a new public and private key after the authentication process is run by the processor 303 a predetermined number of times in order to lower the probability of the ECC private key being obtained by an unintended party. The computer programs and processes discussed above may possibly be stored in a memory source remote from the token 103 and be accessibly via a connection.

As discussed above, the token 103 can include an ECC public key and an ECC private key stored in the memory 305. The challenge can be manipulated (challenge manipulation 317) by the ECC public key by any logical operation. Examples of possible logical operations include concatenating the challenge with the ECC public key or performing an EXCLUSIVE-OR operation on the challenge and the ECC public key. Further, the challenged can be manipulated by performing a Message Authentication Code (MAC) operation on the challenge in which the challenge and the ECC public key are input into a MAC algorithm and a MAC is output. The MAC algorithm may be constructed from other cryptographic primitives, such as keyed-hash message authentication code (HMAC). Any iterative cryptographic hash function, such as MD5 or SHA-1, may be used in the calculation of the HMAC.

As discussed above, the processor 303 is configured to return the manipulated challenge to the server 107 as a reply to the challenge for verification at the server 107. Here, the processor 303 will sign the manipulated challenge with the ECC private key (digital signature 319). The processor 303 will return the signed manipulated challenge and the ECC public key as the reply to the server 107.

Figure 4:
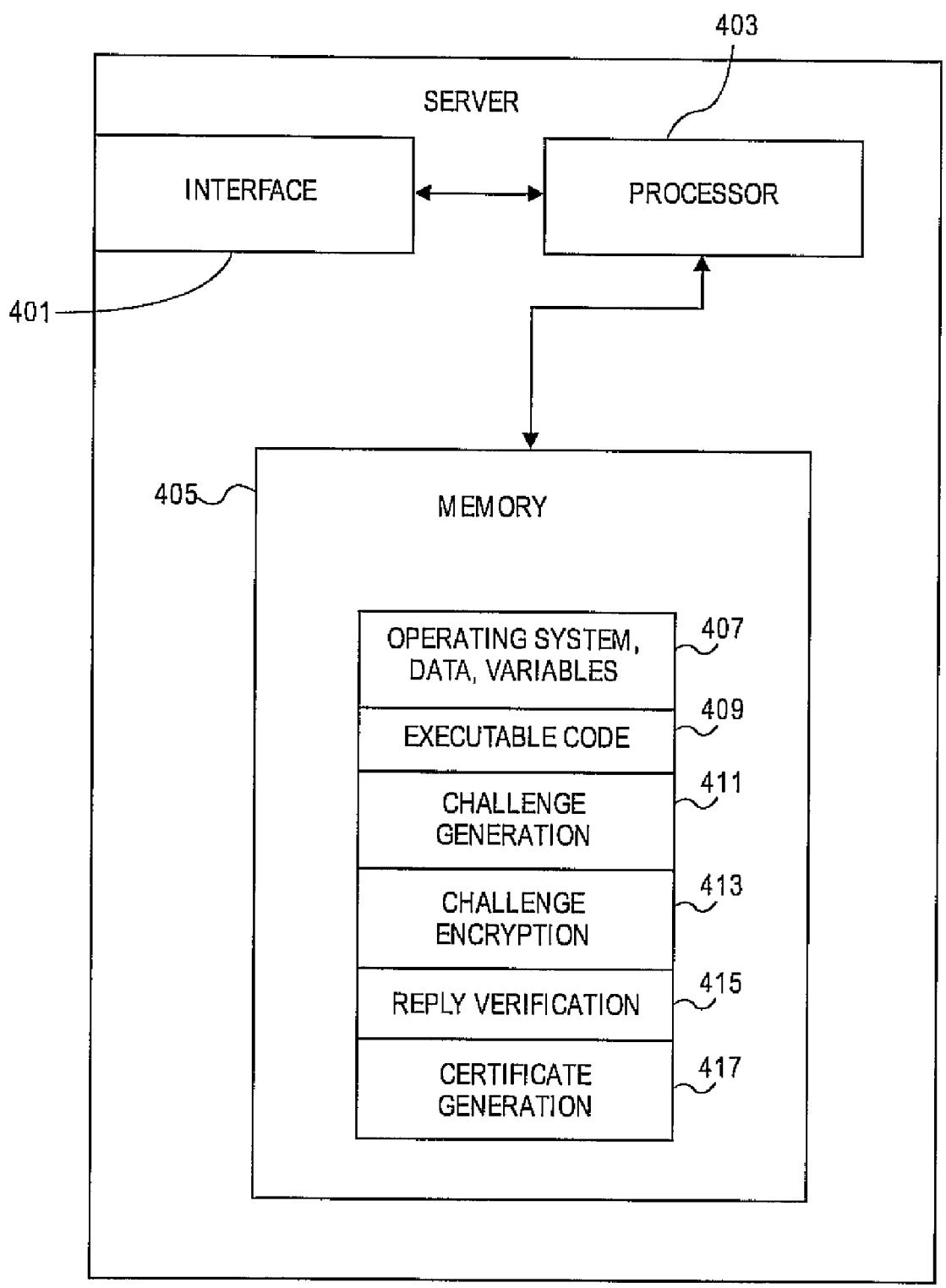
FIG. 4 is a block diagram illustrating portions of an exemplary server.

Referring to FIG. 4, an exemplary server 107 will be discussed. The server 107 includes an interface 401, a processor 403 and a memory 405 as well as optional known peripherals for interfacing with a user, such as a display and input devices (not illustrated). The interface 401 is generally for providing an interaction between the hardware of the connection 105 and the hardware of the server 107, such as, for example, the processor 403. The interface 401 may also be utilized in connection with another computer by known USB technology. The processor 403 can be one of a variety of different processors including general purpose processors, custom processors, controllers, compact eight-bit processors or the like. The processor 403 in the computer 107 may comprise one or more microprocessors and/or one or more digital signal processors. The memory 405 can be coupled to the processor 403 and may comprise a ROM, a RAM, a PROM, flash memory, and/or an EEPROM. The memory 405 may include multiple memory locations and store an operating system, data and variables 407 and executable code 409. Further, the memory 405 can include instructions such as computer programs associated with an authentication process which can direct the processor 403 in controlling the operation of the server 107. The computer programs can include, for example, challenge generation 411, challenge encryption 413, reply verification 415 and certificate generation 417. These are described in more detail below.

The processor 403 is configured to perform an authentication process in which a challenge such as, for example, a random string is generated. The processor 403 encrypts the challenge by a key commonly shared by the server 107 and the token 103 and transmits the encrypted challenge to the token 103 via the connection 105. The processor 403 is further configured to receive a reply from the token 103 that includes the signed manipulated challenge and the ECC public key, and to verify that the signed manipulated challenge was generated at the token 103 based upon the ECC public key (reply verification). In order to verify that the signed manipulated challenge was generated at the token 103, the processor 403 is further configured to perform the predetermined ECC procedure to obtain the manipulated challenge. Particularly, based upon the ECC public key received in the reply, the processor 403 performs the predetermined ECC procedure that was performed at the token 103 to obtain the manipulated challenge at the server 107. As discussed above, the predetermined ECC procedure includes manipulating the challenge by the ECC public key to obtain the manipulated challenge by, for example, concatenating the challenge with the ECC public key, performing a logical operation such as an EXCLUSIVE OR operation on the challenge and the ECC public key, or performing a Message Authentication Code operation on the challenge based upon the ECC public key.

Thereby, the processor 403 can verify if the signed manipulated challenge was actually generated at the token by comparing the signed manipulated challenge received from the token 103 with the manipulated challenge obtained at the server 107. The processor 403 generates a certificate (certificate generation 417) for the token 107 if the signed manipulate challenge is verified to be generated at the token.

Figure 5:
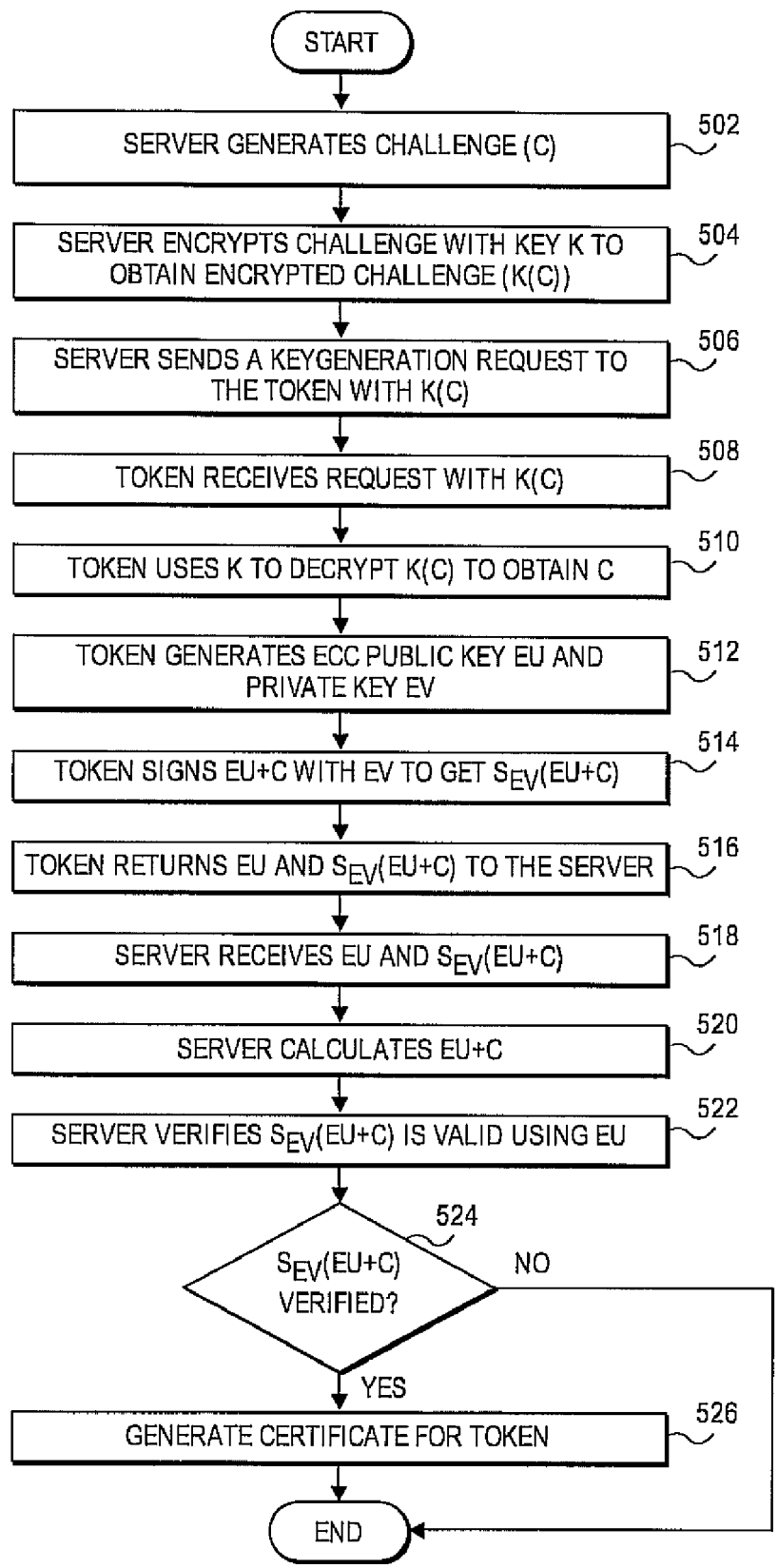
FIG. 5 is a flow chart illustrating an exemplary operation of the token and the server.

Referring to FIG. 5, a flow chart illustrating an authentication process 500 for permitting the server 107 to verify a location factor associated with a token 103 will be discussed.

At 502, the server 107 generates a challenge (C), which, as mentioned above, may be a random string. At 504, the server 107 encrypts the challenge by a key K commonly shared by the server 107 and the token 103 to obtain an encrypted challenge K(C). The key K may be, for example, a symmetric key. At 506, the server 107 transmits the encrypted challenge to the token 103. Particularly, here the server 107 sends a KeyGeneration request to the token 103 with the encrypted challenge K(C).

At 508, the token 103 receives the KeyGeneration request with the encrypted challenge K(C) from the server 107. At 510, the token 103 decrypts the encrypted challenge by the commonly shared key K to obtain the challenge C. It should be noted that the manner of encrypting and decrypting the challenge is not limited to the process described above. For example, the server 107 and the token 103 can communicate the challenge by, for example, a Diffie-Hellman exchange.

At 512, the token 103 generates the elliptic curve cryptography (ECC) public key Eu and the ECC private Key Ev. As discussed above, these keys may be stored in the memory 305 at the time of token manufacture or they may be generated dynamically.

At 514, the token 103 manipulates the challenge by a predetermined ECC procedure to obtain a manipulated challenge. Particularly, here the token 103 manipulates the challenge by the ECC public key Eu to obtain the manipulated challenge. As discussed above, manipulating the challenge may include concatenating the challenge with the ECC public key, performing an EXCLUSIVE OR operation on the challenge and the ECC public key or performing a Message Authentication Code operation on the challenge based upon the ECC public key, or any general logical operation. For example, as shown here, a logical AND operation was performed on the ECC public key Eu and the challenge to obtain Eu+C. Further, the manipulated challenge is signed with the ECC private Key Ev to obtain a digital signature $S_{Ev}(Eu+C)$, which will be referred to as a signed manipulated challenge.

At 516, the token 103 returns the manipulated challenge to the server 107 as a reply to the challenge for verification at the server 107. Particularly, the token 103 returns the ECC public key Eu and the signed manipulated challenge $S_{Ev}(Eu+C)$ to the server 107 as a reply.

At 518, the server 107 receives the signed manipulated challenge $S_{Ev}(Eu+C)$ and the ECC public key Eu from the token 103. At 520, the server 107 also performs the predetermined ECC procedure on the ECC public key Eu to obtain the manipulated challenge Eu+C. Particularly, here the server 107 manipulates the challenge C by the ECC public key Eu to obtain the manipulated challenge Eu+C by the same operation performed by the token 103. That is, the server 107 also calculates Eu+C. As discussed above, manipulating of the challenge by the ECC public key can include one of: concatenating the challenge with the ECC public key; performing an exclusive or operation on the challenge and the ECC public key; and performing a Message Authentication Code operation on the challenge based upon the public key.

At 522, the server 107 verifies that the signed manipulated challenge $S_{Ev}(Eu+C)$ was generated at the token (or is valid) based upon the ECC public key Eu. Particularly, here the server 107 can compare the signed manipulated challenge (digital signature) $S_{Ev}(EU+C)$ received from the token 103 and the manipulated challenge calculated at the server 107.

At 524, if the comparison performed at 522 results in a determination that the digital signature $S_{Ev}(Eu+C)$ of the token 103 does not match the manipulated challenge obtained at the server 107 (NO at 524), that is the signed manipulated challenge (digital signature) $S_{Ev}(Eu+C)$ is not verified, then the process ends. However, if, the comparison performed at 522 results in a determination that the signed manipulated challenge (digital signature) $S_{Ev}(Eu+C)$ of the token 103 does match the manipulated challenge obtained at the server 107 (YES at 524), then at 526 the server 107 generates a certificate for the token 103. Upon receiving the certificate, the token 103 is able to access recourses of the computer system 100.

Therefore, by comparing the digital signature (signed manipulated challenge) received from the token 103 with a calculation performed by the server 103 with the public ECC key, the server 103 can verify that the digital signature, as a location factor, was actually generated at the token 103.

Any of the above described methods and procedures can be embodied as instructions stored on a computer readable medium, which includes storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system can be configured to access, including signals downloaded through the Internet or other networks. Concrete examples of the foregoing include distribution of executable software program(s) of the computer program on a CD-ROM or via Internet download. In a sense, the Internet itself as an abstract entity, is a computer readable medium. The same is true of computer networks in general.

It should also be understood that although various logical groupings of functional blocks were described above, different realizations may omit one or more of these logical groupings. Likewise, in various realizations, functional blocks may be grouped differently, combined, or augmented. Furthermore, one or more functional blocks including those identified herein as optional can be omitted from various realizations. For example, the present description may describe or suggest a collection of data and information. One or more embodiments can provide that the collection of data and information can be distributed, combined, or augmented, or provided locally and/or remotely.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for verifying a token, the method comprising:
   receiving, from a server, a challenge encrypted with a key commonly shared by the server and the token;
   decrypting the challenge with the commonly shared key;
   performing an exclusive or ("XOR") operation on the decrypted challenge and a public key to obtain a manipulated challenge, wherein the public key is stored on or generated by the token;
   signing the manipulated challenge with a private key associated with the public key; and
   returning the signed manipulated challenge to the server as a reply to the challenge for verification at the server.

2. The method of claim 1, wherein the public key is an Elliptic Curve Cryptography (ECC) public key and the private key is an ECC private key.

3. The method of claim 1, wherein the returning of the signed manipulated challenge further includes returning the signed manipulated challenge and the public key.

4. The method of claim 1, wherein the public key and the private key are dynamically generated at the token.

5. A non-transitory computer readable storage medium comprising computer executable instructions for performing the method of claim 1.

6. A method of verifying a token by a server, the method comprising:
  generating, at the server, a challenge encrypted with a key commonly shared by the server and the token;
  sending the encrypted challenge to the token;
  receiving a signed manipulated challenge and a public key from the token, the signed manipulated challenge having been manipulated by the token decrypting the challenge, performing an exclusive or ("XOR") operation on the decrypted challenge and the public key to obtain a manipulated challenge, and signing the manipulated challenge with a private key associated with the public key; and
  verifying that the signed manipulated challenge was generated at the token based upon the public key.

7. The method of claim 6, further comprising:
  manipulating the challenge with the public key at the server,
  wherein the verifying is based upon a comparison between the signed manipulated challenge received from the token and the challenge manipulated at the server.

8. The method of claim 6, wherein the public key is an Elliptic Curve Cryptography (ECC) public key.

9. The method of claim 6, further comprising generating a certificate for the token if the signed manipulated challenge is verified to be generated at the token.

10. A non-transitory computer readable storage medium comprising computer executable instructions for performing the method of claim 6.

11. A server for verifying a token, the server comprising:
  a processor configured to:
    generate a challenge encrypted with a key commonly shared by the server and the token;
    send the encrypted challenge to the token;
    receive a signed manipulated challenge and a public key from the token, the signed manipulated challenge having been manipulated by the token decrypting the challenge, performing an exclusive or ("XOR") operation on the decrypted challenge and the public key to obtain a manipulated challenge, and signing the manipulated challenge with a private key associated with the public key; and
    verify that the signed manipulated challenge was generated at the token based upon the public key.

12. The server of claim 11, wherein the processor is further configured to generate a certificate for the token if the signed manipulated challenge is verified to be generated at the token.

13. The server of claim 11, wherein the processor is further configured to manipulate the challenge with the public key at the server, wherein the verifying is based upon a comparison between the signed manipulated challenge received from the token and the challenge manipulated at the server.

14. The server of claim 11, wherein the public key is an Elliptic Curve Cryptography (ECC) public key.

15. A security token comprising:
  a processor configured to:
    receive, from a server, a challenge encrypted with a key commonly shared by the server and the token;
    decrypt the challenge with the commonly shared key;
    performing an exclusive or ("XOR") operation on the decrypted challenge and a public key to obtain a manipulated challenge, wherein the public key is stored on or generated by the token;
    sign the manipulated challenge with a private key associated with the public key; and
    return the signed manipulated challenge to the server as a reply to the challenge for verification at the server.

16. The security token of claim 15, wherein the public key is an Elliptic Curve Cryptography (ECC) public key and the private key is an ECC private key.

17. The security token of claim 15, wherein the returning of the signed manipulated challenge includes returning the signed manipulated challenge and the public key.

18. The token of claim 15, wherein the public key and the private key are dynamically generated at the token.

* * * * *